United States Patent
Chou et al.

(10) Patent No.: US 10,812,505 B2
(45) Date of Patent: Oct. 20, 2020

(54) SYSTEM AND DETECTING AND DEFENDING METHOD FOR EDGE NETWORK

(71) Applicant: National Chung-Shan Institute of Science and Technology, Taoyuan (TW)

(72) Inventors: Li-Der Chou, New Taipei (TW); Chia-Wei Tseng, New Taipei (TW); Chia-Kuan Yen, Tainan (TW); Wei-Hsiang Tsai, Taipei (TW); Tsung-Fu Ou, Taoyuan (TW); Yi-Hsuan Chiu, Taoyuan (TW); Wei-Yu Chen, Taipei (TW); Meng-Sheng Lai, Hsinchu County (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 134 days.

(21) Appl. No.: 16/218,421

(22) Filed: Dec. 12, 2018

(65) Prior Publication Data
US 2020/0195661 A1 Jun. 18, 2020

(51) Int. Cl.
*H04L 29/06* (2006.01)
*H04L 12/851* (2013.01)
*H04L 12/715* (2013.01)
*G06N 3/02* (2006.01)

(52) U.S. Cl.
CPC ...... *H04L 63/1416* (2013.01); *H04L 47/2483* (2013.01); *H04L 63/0245* (2013.01); *H04L 63/1425* (2013.01); *H04L 63/1441* (2013.01); *G06N 3/02* (2013.01); *H04L 45/64* (2013.01)

(58) Field of Classification Search
CPC . H04L 63/00; H04L 63/0227; H04L 63/0263; H04L 63/14; H04L 63/1408; H04L 63/1416; H04L 63/1425; H04L 63/1433; H04L 63/1441; H04L 63/1466; H04L 63/1458
See application file for complete search history.

(56) References Cited

U.S. PATENT DOCUMENTS

| | | | |
|---|---|---|---|
| 2018/0109557 A1* | 4/2018 | Yoo | H04L 43/16 |
| 2018/0152475 A1* | 5/2018 | Park | G06N 20/00 |
| 2018/0234454 A1 | 8/2018 | Aggarwal | |

OTHER PUBLICATIONS

Raja Majid Ali Ujjan et al., Suspicious Traffic Detection in SDN with Collaborative Techniques of Snort and Deep Neural Networks, 2018 IEEE 20th International Conference on High Performance Computing and Communications, IEEE 16th International Conference on Smart City, IEEE 4th Intl. Conference on Data Science and Systems, Jun. 28, 2018, pp. 915-920, XP033506942.

\* cited by examiner

*Primary Examiner* — Edward Zee
(74) *Attorney, Agent, or Firm* — Winston Hsu

(57) ABSTRACT

A computer system includes an openflow switch, configured to receive a plurality of packets; a network controller, coupled to the openflow switch and configured to determine a route of each of the plurality of packets; and a detecting and defending system, configured to perform transformation of information formats of the plurality of packets, retrieve and label the plurality of packets to determine whether the plurality of packets are abnormal or not and generate a defending determination.

4 Claims, 4 Drawing Sheets

SYSTEM AND DETECTING AND DEFENDING METHOD FOR EDGE NETWORK

BACKGROUND OF THE INVENTION

1. Field of the Invention

The present disclosure relates to a system and detecting and defending method for edge network, and more particularly, to a system and detecting and defending method for edge network capable of detecting and defending malicious attacks.

2. Description of the Prior Art

With the development of network technology and the growing of 5$^{th}$ generation (5G) wireless system technology, threats to network information security are increased. Due to the multi-application of 5G wireless system, all kinds of new service, new architecture, and new technique come with challenges of security and protection of users' privacy. According to the statistics of IDC (International Data Corporation), over 50 billion terminals and devices of internet will exist in 2020, and over 50% data are analyzed, processed and stored at the edge network, which increases demands of calculation of the edge network. In response to the threats to the information security of the multi-application internet in the future, updation and innovation measurements of the information security protection should be accelerated. In addition, detection and defense are the core issues what the current internet security may encounter. Therefore, how to design a protection mechanism for the edge network security more thoroughly, and detect and recognize the malicious attack signaling to provide differential security service is a goal for the future internet and the development of information security.

In the field of information security, except mechanisms of antivirus software, firewall, encryption system, backup and certification, Intrusion Detection System (IDS) is an important defense line for the entrepreneurs to implement the network security. From the perspective of intrusion detection technology, the information security may be classified into misuse detection and anomaly detection. The former utilizes a signature based manner to determine the intrusion according to a predefined signature rules with high accuracy. However, as amounts of weak spots and vulnerability of software are increasingly exposed, the predefined signature rules inflate rapidly, which indirectly affects the detection efficiency and is unable to detect unknown attacks. The latter collects legal actions of user and normal activities of system to supervise whether the user or the system is normal, which may detect unknown type of intrusion, but is keen to misjudge legal actions as abnormal actions. Therefore, the disadvantages stated above of the prior art should be improved.

SUMMARY OF THE INVENTION

The present disclosure provides a system and detecting and defending method for the edge network to analyze the packets and recognize possible attacks, so as to reduce the affects by the malicious attacks and improve the information security of the edge network.

An embodiment of the present disclosure discloses a computer system, comprising an openflow switch, configured to receive a plurality of packets; a network controller, coupled to the openflow switch and configured to determine a route of each of the plurality of packets; and a detecting and defending system, configured to perform transformation of information formats of the plurality of packets, retrieve and label the plurality of packets to determine whether the plurality of packets are abnormal or not and generate a defending determination.

Another embodiment of the present disclosure discloses a detecting and defending method for an edge network, comprising receiving a plurality of packets; performing transformation of information formats of the plurality of packets, retrieving and labeling the plurality of packets, to determine whether the plurality of packets are abnormal or not and generate a defending determination.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
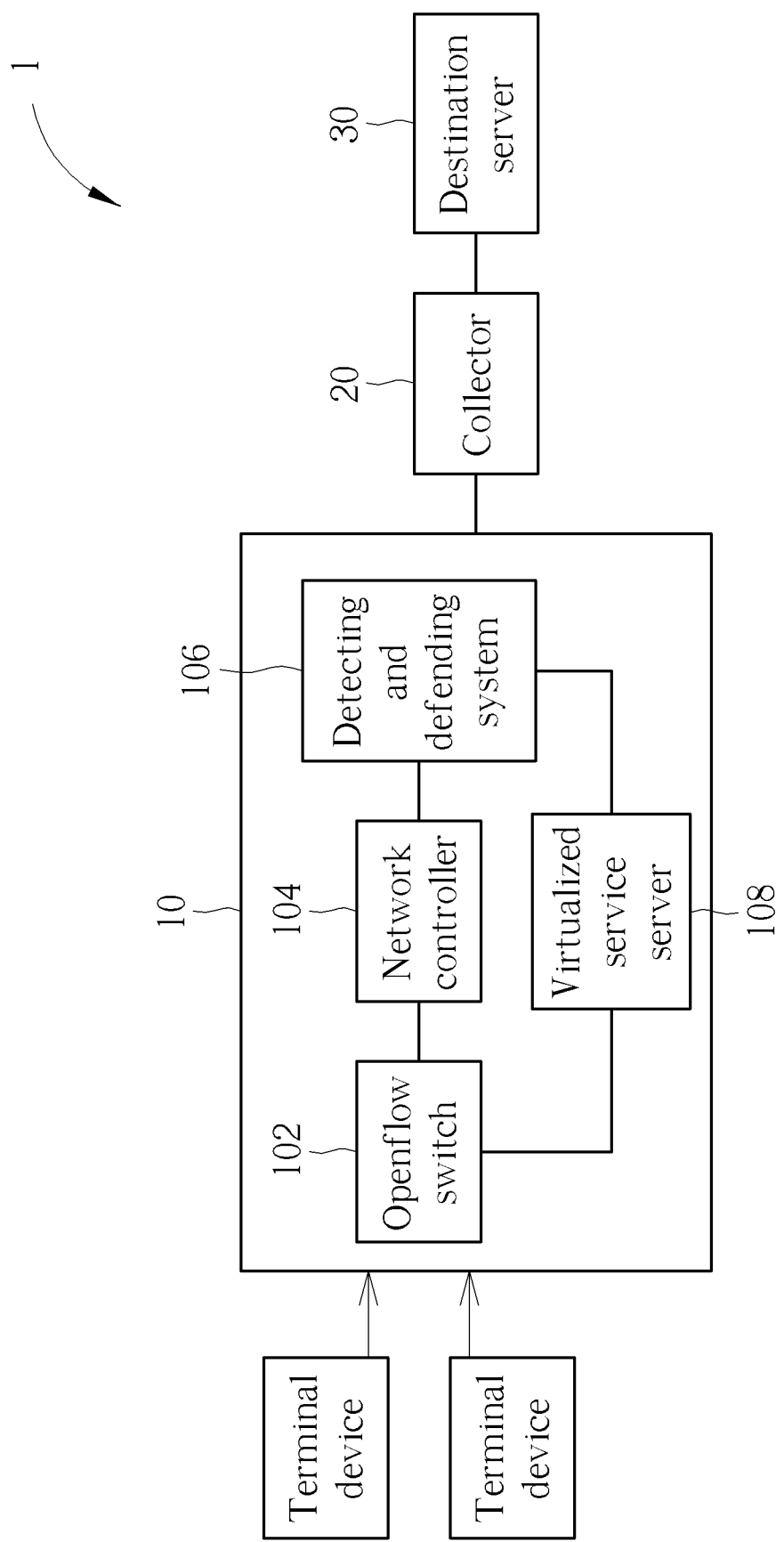
FIG. 1 is a schematic diagram of a network system according to an embodiment of the present disclosure.
Figure 2:
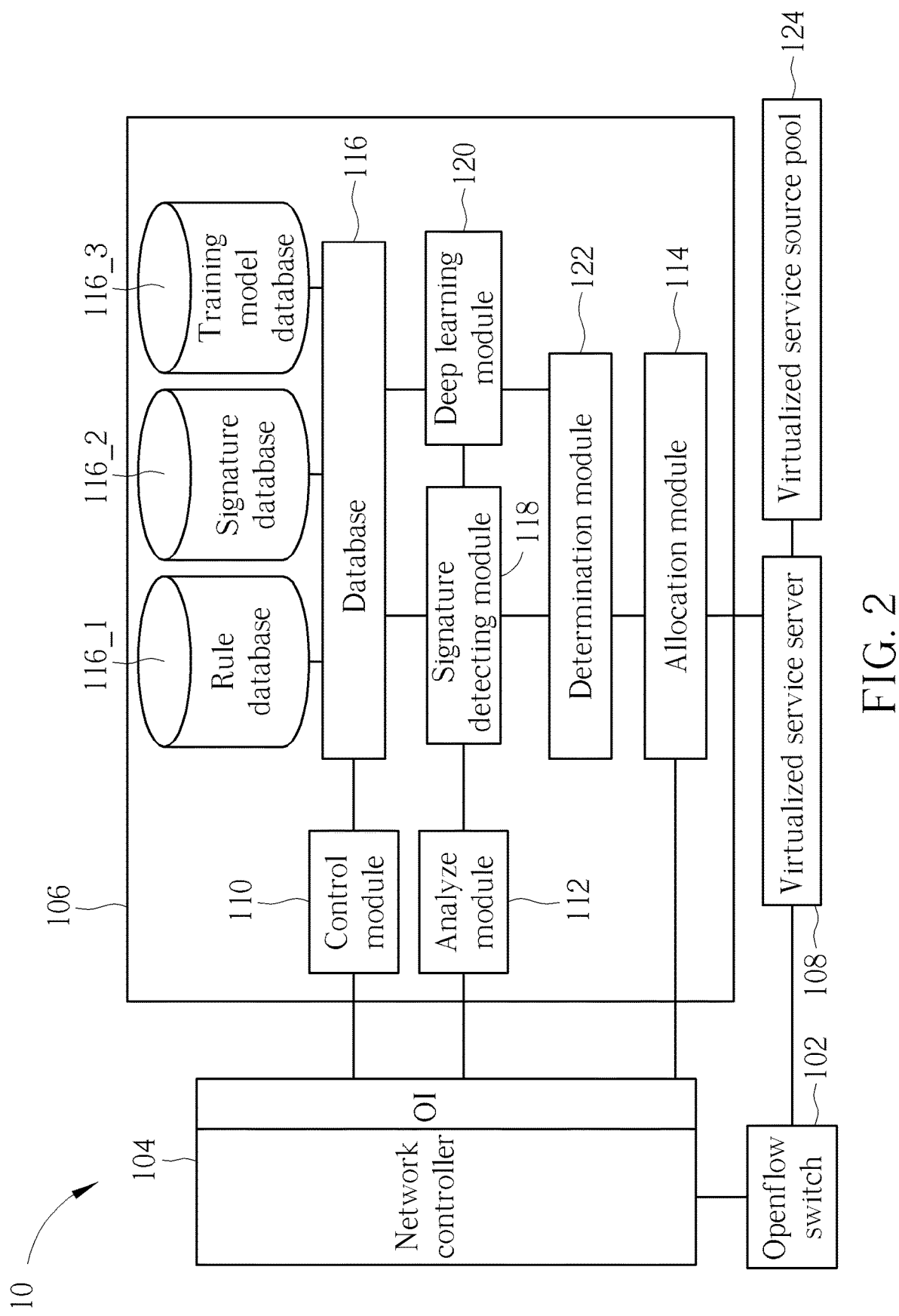
FIG. 2 is a schematic diagram of a detecting and defending system according to an embodiment of the present disclosure.

Please refer to FIG. 1, which is a schematic diagram of a network system 1 according to an embodiment of the present disclosure. The network system 1 includes at least a terminal device, a computer system 10, a collector 20 and a destination server 30. The terminal device may be any kind of mobile terminal device, such as a computer, mobile pad or mobile phone, which generates signaling or a plurality of packets. The terminal device may be a legal terminal device or a malicious/suspicious terminal device which accesses to an edge network, e.g. Ethernet or wireless access network (WLAN), via the computer system 10. A collector 20 thereby collects the signaling or packets and transfers the collected signaling or packets toward the destination server 30 via a communication network.

The computer system 10 includes an openflow switch 102, a network controller 104, a detecting and defending system 106 and a virtualized service server 108. The openflow switch 102 is configured to receive signaling or packets generated by the terminal device. The network controller 104 is coupled to the openflow switch 102 and is configured to determine a route of each signaling or each of the packets, and the detecting and defending system 106 is configured to perform transformation of information formats of the plurality of packets, retrieve and label the packets to determine whether the packets are abnormal or not and thereby generate a defending determination. In an embodiment, the openflow switch 102 may direct the received signaling or packets to the detecting and defending system 106, the virtualized service server 108 or collector 20 according to the defending determination. For example, the openflow switch 102 may amend or transfer the received packets to a designate port, or transfer the received packets the network controller 104, which is called Packet-in; alternatively, the openflow switch 102 may receive the packets from the network controller 104 and transfer the packers to the designate port, which is called Packet-out.

Therefore, the computer system 10 of the present disclosure analyzes the packets and recognizes possible attacks to reduce the affects by the malicious attacks and improve the information security of the edge network.

In detail, the detecting and defending system 106 further includes a control module 110, an analyze module 112, an allocation module 114, a database 116, a signature detecting module 118, a deep learning module 120 and a determination module 122. In an embodiment, an operation and management interface OI is connected with the control module 110, the analyze module 112 and the allocation module 114, so as to integrate the detecting and defending system 106 and the network controller 104. The control module 110 is configured to update a plurality of openflow rules to the database 116. The analyze module 112 is configured to transform information formats of the packets and label a plurality of signaling signatures corresponding to the information formats of the packets. The allocation module 114 is configured to perform an allocation of packets, i.e. perform the security protection, according to the defending determination made by the determination module 122. The database 116 is configured to link with a rule database 116_1, a signature database 116_2 and a training model database 116_3, wherein the rule database 116_1 is configured to store rule information of the signaling or packets, the signature database 116_2 is configured to store the signaling signatures corresponding to the signaling or packets, and the training model database 116_3 is configured to store a deep neutral network (DNN) training model.

The signature detecting module 118 is coupled to the database 116 and the analyze module 112 and is configured to compare the signaling signatures corresponding to the information formats of the packets with the signature database 116_2 to determine a first result. The deep learning module 120 is coupled to the database and the analyze module 112 and is configured to take the signaling signatures corresponding to the information formats of the packets as input information for classification of a deep neural network (DNN) to determine a second result. The determination module 122 is coupled to the signature detecting module 118 and the deep learning module 120 and is configured to generate the defending determination according to the first result and the second result.

In an embodiment, the deep learning module 120 performs a linear or non-linear transformation with multiple-processing layers for the input information, and extracts or retrieves features of the input information to represent the input information. In addition, the DNN is utilized for generating a deep learning model for transforming the input information into a prediction result. Therefore, the deep learning module 120 classifies the input information (i.e. the signaling signatures corresponding to the information formats of the packets), reduces the irrelevant features from the input information accordingly and extracts the features of the packets to generate the second result.

In order to generate the determination result, please refer to Table 1. Table 1 is the defending determinations corresponding to different combinations of the first result and the second result. In Table 1, "0" represents that the result determined by the signature detecting module 118 or the deep learning module 120 is normal, and "1" represents that the result determined by the signature detecting module 118 or the deep learning module 120 is abnormal. As can be seen from Table 1, when both of the first result and the second result are normal, i.e. (0,0), the packets are normal and transferred according to the openflow rules; when the first result is abnormal, i.e. the first result and the second result is (1,0) or (1, 1), the determination module 122 determines that the packet belongs to an attack and adopts a virtualized firewall to block a source IP of the attack; when the first result is normal and the second result is abnormal, i.e. the first result and the second result is (0,1), the determination module 122 determines that the packet belongs to an attack and limits a bandwidth of the attack and control the source IP. Notably, the first result and the second result may be determined at the same time or individually, and not limited thereto.

TABLE 1

| First Result | Second Result | Defending Determination |
|---|---|---|
| 0 | 0 | Normal |
| 1 | 0 | Virtualized the firewall |
| 0 | 1 | Bandwidth limitation |
| 1 | 1 | Virtualized the firewall |

After the defending result is determined, the virtualized service server 108 allocates the virtualized service accordingly. In an embodiment, a virtualized service source pool 124 is coupled to the virtualized service server 108, which may be utilized for storing the virtualized services, e.g. firewall or intrusion detection system (IDS).

The examples mentioned above briefly explain the computer system 10 of the present disclosure. Notably, those skilled in the art may make proper modifications. For example, the allocation corresponding to the defending determination may be modified according to different system requirements, but not limited thereto, which belongs to the scope of the present disclosure.

Figure 3:
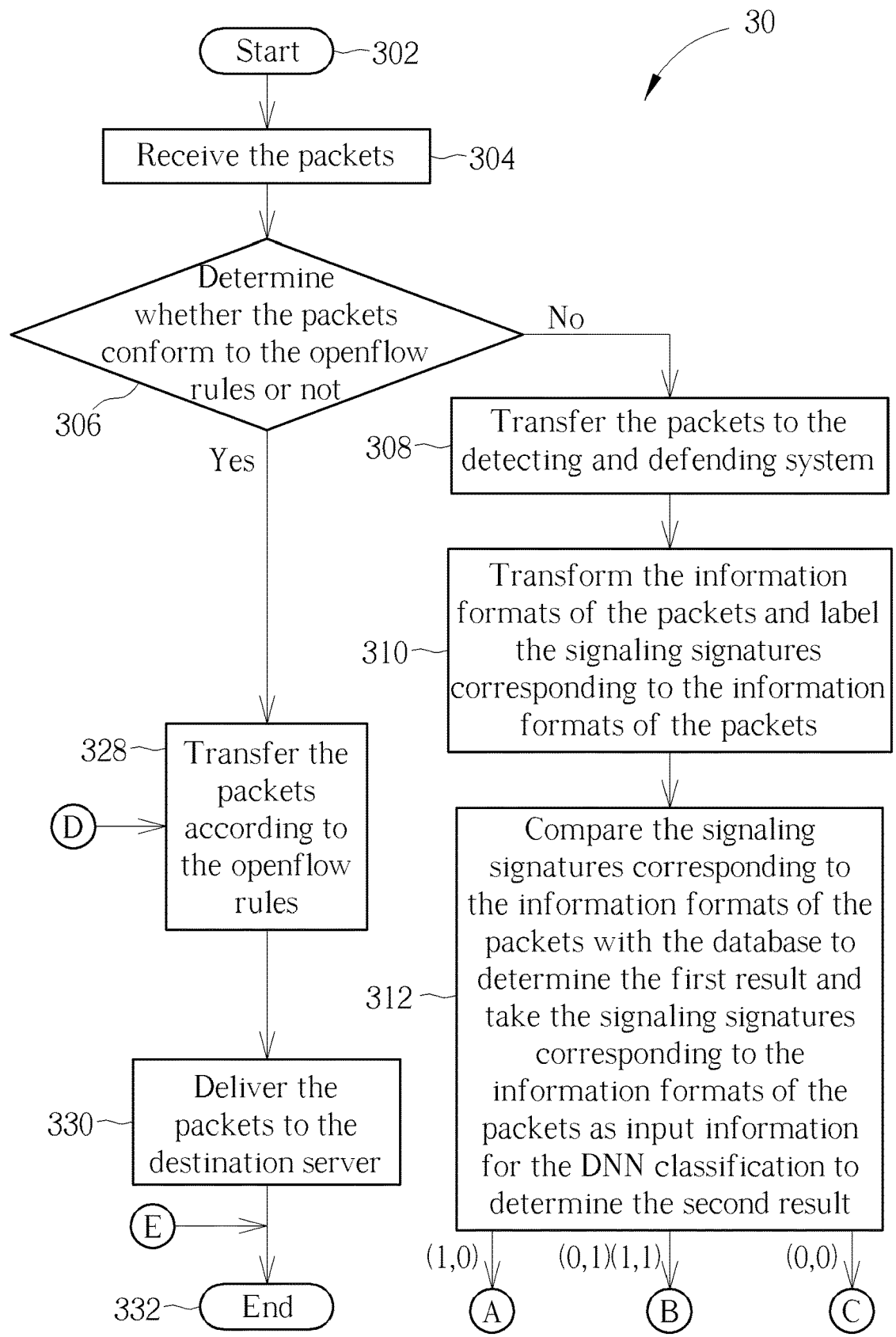
FIGS. 3 and 4 are schematic diagrams of a process to an embodiment of the present disclosure.
Figure 4:
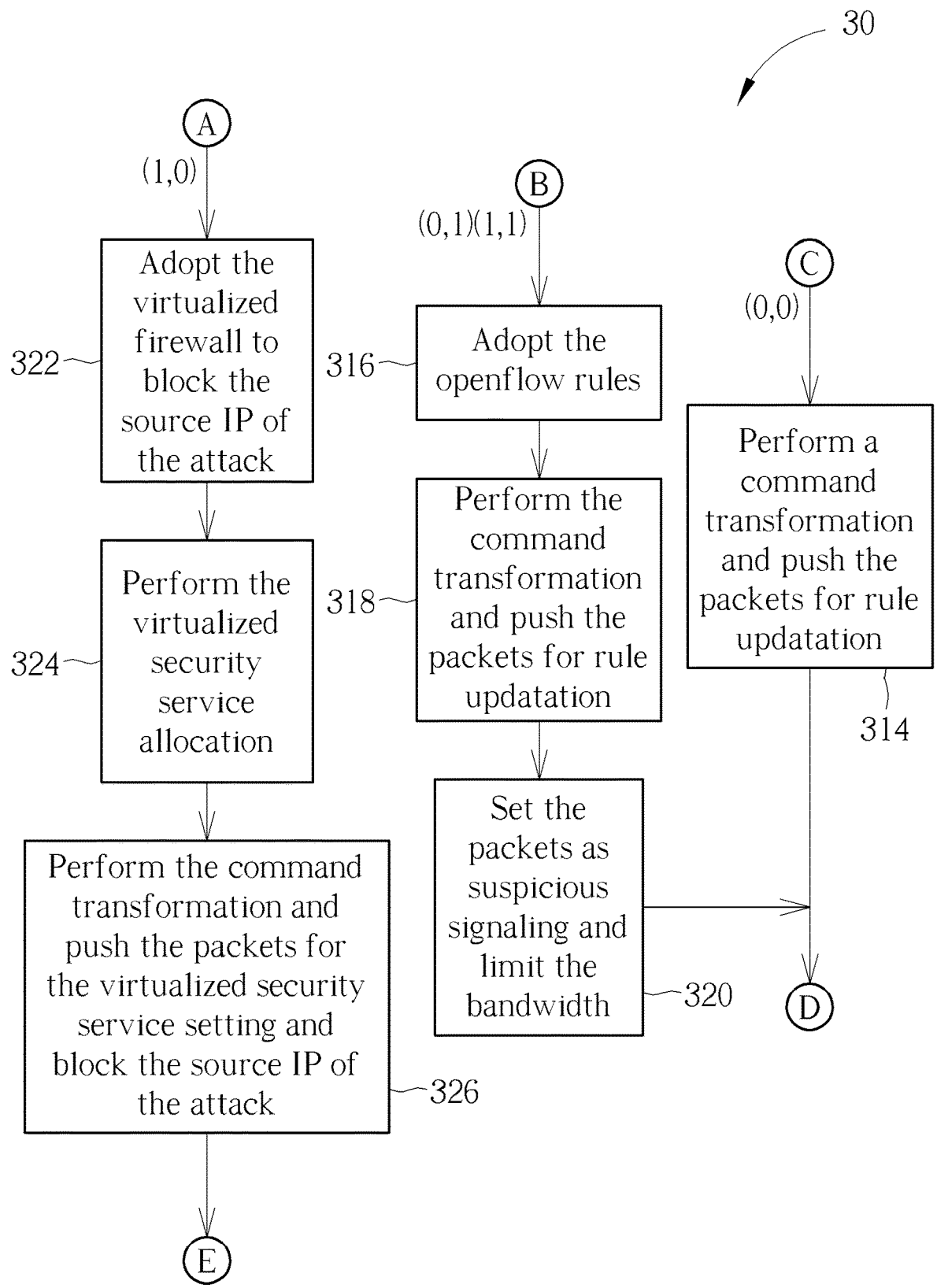

According to different applications and design concepts, the computer system 10 of the present disclosure may be implemented in all kinds of methods. An operation method of the computer system 10 may conclude to a process 30, which is shown in FIGS. 3 and 4. The process 30 includes the following steps:

Step 302: Start.

Step 304: Receive the packets.

Step 306: Determine whether the packets conform to the openflow rules or not; when yes, execute step 328, and when no, execute step 308.

Step 308: Transfer the packets to the detecting and defending system 106.

Step 310: Transform the information formats of the packets and label the signaling signatures corresponding to the information formats of the packets.

Step 312: Compare the signaling signatures corresponding to the information formats of the packets with the database to determine the first result and take the signaling signatures corresponding to the information formats of the packets as input information for the DNN classification to determine the second result.

Step 314: When the first result and the second result are (0,0), perform a command transformation and push the packets for rule updatation.

Step 316: When the first result and the second result are (0,1) or (1, 1), adopt the openflow rules.

Step 318: Perform the command transformation and push the packets for rule updatation.

Step 320: Set the packets as suspicious signaling and limit the bandwidth.

Step 322: When the first result and the second result are (1,0), adopt the virtualized firewall to block the source IP of the attack.

Step 324: Perform the virtualized security service allocation.

Step 326: Perform the command transformation and push the packets for the virtualized security service setting and block the source IP of the attack.

Step 328: Transfer the packets according to the openflow rules.

Step 330: Deliver the packets to the destination server.

Step 332: End.

Notably, steps 314, 318 and 324 are executed by the allocation module 114 of the computer system 10, and steps 316 and 322 are executed by the determination module 122 of the computer system 10. The operation of the process 30 can be known by referring to the embodiments of the computer system 10 described above, and are not repeated herein for brevity.

The process 30 of the present disclosure may precisely distinguish denial-of-service (DoS) attacks form the normal packets according to the signatures of the packets, and thereby improves a recognition rate of the attacks.

In summary, the present disclosure provides a computer system and a detecting and defending method for the edge network, and more particularly, to analyze the packets and recognize possible attacks, so as to reduce the affects by the malicious attacks and improve the information security of the edge network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system, comprising:
an openflow switch, configured to receive a plurality of packets;
a network controller, coupled to the openflow switch and configured to determine a route of each of the plurality of packets; and
a detecting and defending system, configured to perform transformation of information formats of the plurality of packets, retrieve and label the plurality of packets to determine whether the plurality of packets are abnormal or not and generate a defending determination;
wherein the detecting and defending system comprises:
a control module, coupled to the network controller via an interface and configured to update a plurality of openflow rules to a database;
an analyze module, coupled to the network controller via the interface and configured to transform the information formats of the plurality of packets and label a plurality of signaling signatures corresponding to the information formats of the plurality of packets;
an allocation module, coupled to the network controller via the interface and configured to perform an allocation of the plurality of packets according to the defending determination;
a signature detecting module, coupled to the database and the analyze module, and configured to compare the plurality of signaling signatures corresponding to the information formats of the plurality of packets with the database to determine a first result;
a deep learning module, coupled to the database and the analyze module, and configured to take the plurality of signaling signatures corresponding to the information formats of the plurality of packets as input information for classification of a deep neural network (DNN) to determine a second result; and
a determination module, coupled to the signature detecting module and the deep learning module, and configured to generate the defending determination according to the first result and the second result;
wherein when the first result is abnormal, the allocation module adopts a virtualized firewall to block a source IP of an attack; and when the first result is normal and the second result is abnormal, the allocation module limits a bandwidth of the attack to control the source IP of the attack.

2. The computer system of claim 1, wherein the database comprises a rule database, a signature database and a training model database, and the interface is configured to integrate the control module, the analyze module and the allocation module.

3. A detecting and defending method for an edge network, comprising:
receiving a plurality of packets;
performing transformation of information formats of the plurality of packets, retrieving and labeling the plurality of packets, to determine whether the plurality of packets are abnormal or not and generate a defending determination; and
transferring the plurality of packets to a corresponding plurality of destinations, when the plurality of packets conform to a plurality of openflow rules;
wherein the plurality of openflow rules are stored in a database;
wherein the step of determining whether the plurality of packets are abnormal or not to generate the defending determination comprises:
comparing the plurality of signaling signatures corresponding to the information formats of the plurality of packets with a database to determine a first result;
taking the plurality of signaling signatures corresponding to the information formats of the plurality of packets as input information for classification of a deep neural network to determine a second result; and
generating the defending determination according to the first result and the second result;
when the first result is abnormal, adopting a virtualized firewall to block a source IP of an attack; and when the first result is normal and the second result is abnormal, limiting a bandwidth of the attack to control the source IP of the attack.

4. The detecting and defending method of claim 3, wherein the step of performing transformation of the information formats of the plurality of packets, retrieving and labeling the plurality of packets comprises:
transforming the information formats of the plurality of packets; and
labeling a plurality of signaling signatures corresponding to the information formats of the plurality of packets.

* * * * *